United States Patent [19]

Faller

[11] 4,257,530
[45] Mar. 24, 1981

[54] LINED TRAY

[75] Inventor: Rudolph A. Faller, Edina, Minn.

[73] Assignee: Champion International Corporation, Stamford, Conn.

[21] Appl. No.: 52,612

[22] Filed: Jun. 27, 1979

Related U.S. Application Data

[62] Division of Ser. No. 928,357, Jul. 27, 1978, Pat. No. 4,200,481.

[51] Int. Cl.³ .......................... B65D 5/58; B65D 5/64
[52] U.S. Cl. ................................. 220/469; 206/484; 206/525; 229/32; 229/43
[58] Field of Search .................. 229/32, 43, 3.5 R; 206/525, 484; 220/461, 469, 418; 426/113, 124; 156/285, 287

[56] References Cited

U.S. PATENT DOCUMENTS

| | | | |
|---|---|---|---|
| 2,750,294 | 6/1956 | Peters | 426/124 |
| 3,218,776 | 11/1965 | Cloud | |
| 3,468,468 | 9/1969 | Foote | 224/3.5 R |
| 3,756,495 | 9/1973 | Bemiss | 220/418 X |
| 3,779,447 | 12/1973 | Bemiss | 220/418 X |
| 3,785,544 | 1/1974 | Smith | 229/43 X |
| 3,851,571 | 12/1974 | Nichols | 426/113 X |
| 3,863,832 | 2/1975 | Gordon et al. | 229/32 X |
| 3,932,105 | 1/1976 | Knoell | 425/504 |
| 3,957,558 | 5/1976 | Lee et al. | |
| 4,010,230 | 3/1977 | Repennins | 156/287 X |
| 4,052,241 | 10/1977 | Walter | 156/285 X |
| 4,092,201 | 5/1978 | Wommelsdorf | |
| 4,124,434 | 11/1978 | Wommelsdorf et al. | |

Primary Examiner—Allan N. Shoap
Attorney, Agent, or Firm—Evelyn M. Sommer

[57] ABSTRACT

Individual flanged trays are deposited on a conveyor belt. A continuous film is applied across the top surface of the trays. A heated flat plate is pressed into the film and causes the tray flanges to bend to a desired position. The plate heats the film throughout and bonds the film to the tray flanges. Directly thereafter and while at the same station, vacuum is applied which serves to deform the film into the interior of the trays. The formed film preferably has rounded corners and may be partially separated from the bottom wall and side walls of the tray by an air space. Thereafter, a heated plug preferably having insulated sides, heat seals the now deformed film to the bottom wall of the tray. A cutting device trims the excess film at the tray flanges. The excess film may be scavenged and recycled. The cutting device may be provided at the deforming station or the sealing station or at a trimming station downstream of either of these stations. After one or more food products is deposited in each film lined tray, a second film is applied across the surface of the filled tray and heat sealed to the first film at the tray flanges. A single trimming station might be used to trim both the second film and the now deformed and sealed first film.

2 Claims, 7 Drawing Figures

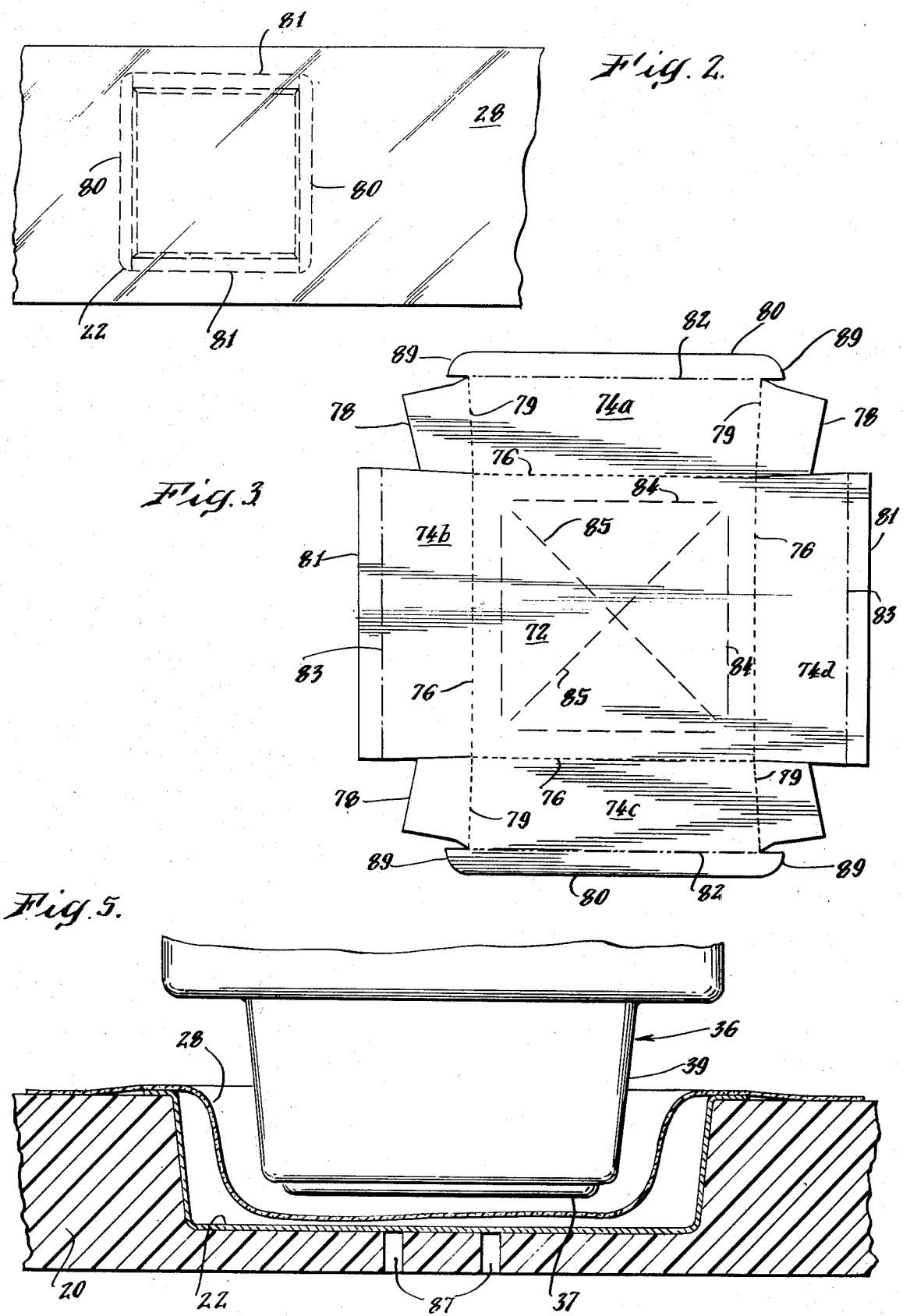

LINED TRAY

The present application is a division of application Ser. No. 928,357, filed July 27, 1978, now U.S. Pat. No. 4,200,481.

BACKGROUND OF THE INVENTION

The present invention relates to trays and more particularly to methods and apparatus for producing lined trays.

Many products are merchandised in closed trays in high volumes but at a relatively low profit margin on a per tray basis. Examples of high volume, low margin products are typical frozen food products such as vegetables entrees or complete dinners which are packaged in closed trays before freezing. Such products are maintained in a frozen state until reheated by a consumer in a conventional or microwave oven.

The packaging operation by which the food products are sealed in individual trays should be highly automated and should employ low cost materials to reduce the packaging costs without reducing the integrity of the package seal. Paperboard is strong and relatively inexpensive, and therefore highly suitable for many packaging applications.

U.S. Pat. No. 3,932,105, issued Jan. 13, 1976, and assigned to the assignee of the present invention, discloses equipment and a process for lining an erected paperboard tray with a continuous sheet of film. In a preferred embodiment, the film is heated and then drawn into intimate contact with the interior tray walls by applying a vacuum to the exterior bottom wall and exterior side walls of the tray. While the equipment and process disclosed in this patent produce leak-free, low-cost lined trays, there is room for improvement.

The trays produced in accordance with the patent have a liner which conforms to the interior tray walls, forming a single product-receiving volume. The erected (and lined) paperboard tray tends to have angular corners. When such a tray is heated in a microwave oven, the food in the corners is exposed to relatively greater amounts of microwave energy than the food in the rest of the carton, resulting in uneven heating.

While a press-formed tray might be employed to avoid the angular corners of an erected tray, press formed trays have other disadvantages. Graphic material printed on the tray tends to be distorted. The process itself is at least initially more costly since each set of press-forming tooling is custom made for the particular tray shape to be formed. Press formed trays also suffer from the disadvantage that such trays are inherently difficult to seal.

SUMMARY OF THE INVENTION

The present invention comprises improved methods and apparatus for producing lined trays. The improved methods and apparatus lend themselves to automated packaging with low cost materials such as paperboard while providing a tray which can be used with improved results in both conventional and microwave ovens.

In accordance with the invention, a lined tray is produced by transporting a plurality of individual open-topped trays along a predetermined path. A continuous film is applied across the erected trays in contact with the edge portions thereof. A heated, substantially flat plate contacts the film to heat the film throughout and to bond the film to the edge portions of the trays. Successive regions of the film are deformed partially into the interior of successive trays by establishing a vacuum within the tray for a limited period of time. While the tray corners may be angular, the liner is shaped with rounded corners to assure more even heating in microwave ovens and to establish a layer of insulating air between portions of the liner and the tray. A heated plug is then used to heat seal the film to a central area on the tray floor. After at least one product is deposited in each film-lined tray, a film is applied across the top of the product-filled tray. The top film is sealed with the first film at the periphery of each tray. Excess film is trimmed from the edge portions of each tray.

DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

FIG. 2 is a top view of a tray and overlying film prior to edge sealing and deformation of the film;

FIG. 3 is a top view of a blank suitable for practicing one embodiment of the invention;

FIG. 5 is an exploded view showing a reciprocating heated plug used to heat seal a deformed film to a central area of the bottom wall of the tray;

DETAILED DESCRIPTION

Figure 1:
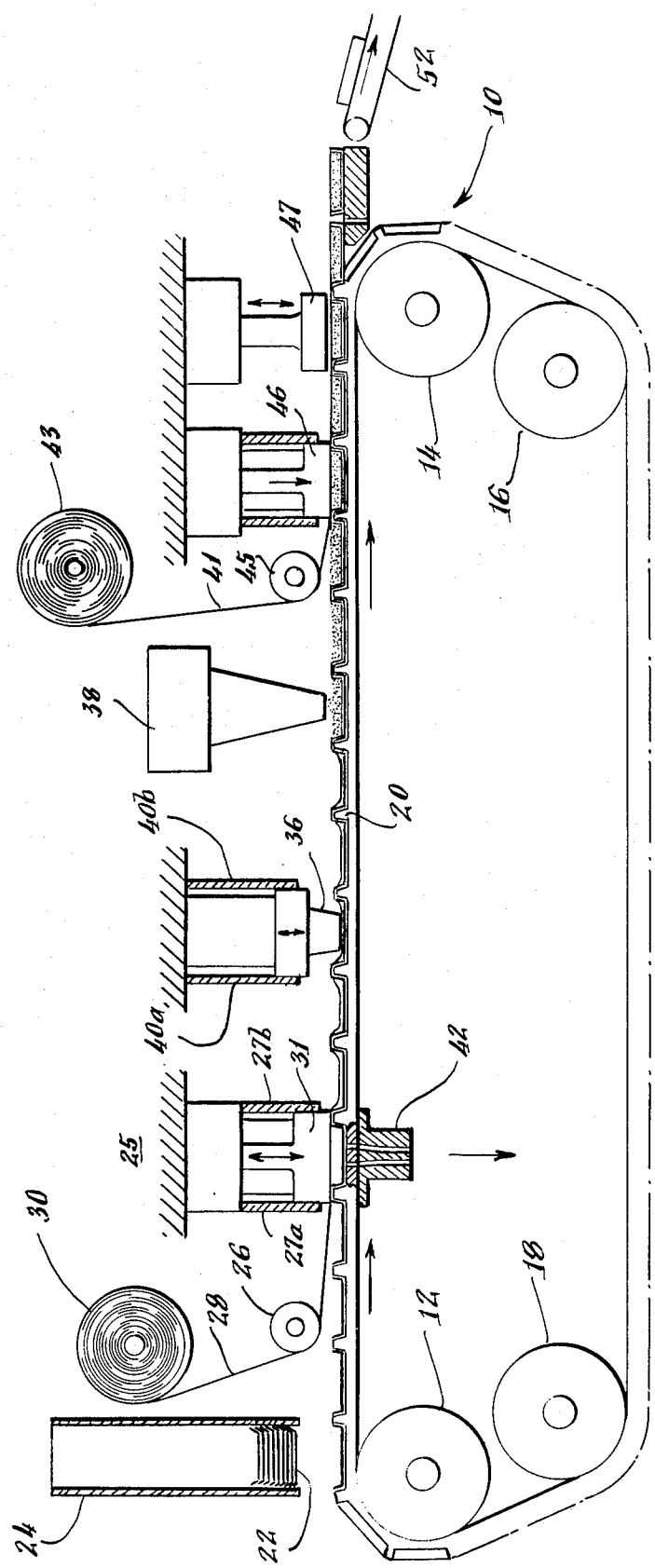
FIG. 1 is a side view of an apparatus for producing lined trays in accordance with the present invention.

Referring to FIG. 1, an apparatus for making a lined tray in accordance with the present invention includes a conveyor such as an endless conveyor belt 10 which travels in a loop about rollers 12, 14, 16 and 18. At least one of the rollers is driven by a conventional drive motor (not shown) while the remaining rollers may be idler rollers. The outer surface of the conveyor belt 10 includes spacing blocks 20 for positioning previously-erected, flanged trays, such as tray 22, which are delivered to the conveyor belt 10 one or more at a time by a conventional de-nesting apparatus 24. Other conventional devices may be used to feed the trays 22 onto the conveyor belt 10.

The conveyor belt 10 transports the positioned trays from left to right past a guide roll 26 for a continuous film 28 stored on a film supply reel 30. The film 28 forms a continuous web which is drawn into contact with the flanges of the individual trays 22 by conventional film advancing mechanisms (not shown). The individual trays 22 and overlying film 28 are transported to a heating/edge sealing/deforming station 25 which includes a flat heated plate 31 which intimately contacts the film to heat and soften the film throughout its thickness.

Heated plate 31 may activate heat-sensitive adhesives or coatings previously deposited on the tray flanges for subsequent bonding to the film. As an alternative, the inherent adhesive capabilities of certain types of film may render it unnecessary to provide a separate adhesive or coating.

Plate 31, details of which are described later, is mounted on suitable guides (27a and 27b) for reciprocal movement relative to the conveyor belt 10. The plate 31 presses the film against the flanges of each tray and forces the flanges toward contact with the supporting spacing blocks. Through the use of time, temperature and pressure, the plate 31 causes the film to be bonded to the flanges which in turn tends to rigidize the tray.

After the heating/edge sealing step, the film is deformed into the tray by establishing a vacuum beneath the tray and at vacuum device 42, which may be reciprocally mounted. Air is exhausted through perforations in the tray bottom wall to draw the film down. As will be discussed in more detail later, the deformation process may be aided by directing air through plate 31 against the top surface of the film.

A heated mandrel or plug 36 downstream of the heating/deforming station is mounted for reciprocating movement along the pair of guides 40a and 40b. Heated plug 36, which is preferably somewhat smaller than the tray, is moved through a downward stroke which heat seals an area of the softened film to the bottom wall of the tray. It is also possible to apply heat from the bottom side of the tray for effecting the sealing of the film to the bottom tray or for facilitating the heat sealing when heated plug 36 is employed.

The external configuration of plug 36 is smaller and more rounded than the internal configuration of the individual trays 22 and allows the deformed liner to be heat sealed to a central area on the tray bottom wall while the smoothly rounded sides and corners of the film define air pockets between the film and the side walls of the tray.

The operation of the edge sealing/deforming station and the heated plug 36 are synchronized with movements of conveyor belt 10 to assure that the operations are centered on individual trays 22.

Film 28 may be any continuous web material which deforms with the application of heat, positive air pressure, and/or vacuum. The preferred material is coextruded polyester film available from the Minnesota Mining and Manufacturing Company of St. Paul, Minnesota. Especially preferred is film No. 5840 available from this source. Depending upon the end use, film materials such as nylon, polypropylene and modified polyethylene would also be suitable. Generally, the film material and the tray material will be chosen such that a tight bond will be established between the deformed film and selected areas of the underlying tray and tray flanges. If necessary, supplementary adhesive material or a heat sensitive coating may be used to improve the film-to-tray bond. It is not essential that the adhesive or coating be coextensive with the tray walls. Adhesive or coating can be applied to a few selected areas on the floor and/or side walls of the tray. Where the tray is to be used for food products, the film and adhesive must be selected from materials having the necessary governmental approvals.

The lined trays are then transported past one or more product dispensing devices, such as device 38, which deposit one or more discrete products and/or metered amounts of bulk products into each lined tray. The configuration of the product dispensing devices, which are conventional, will naturally vary with the type of products being dispensed.

The product-filled lined trays may be covered with a second film or a lid on which a suitable film has been extruded, laminated or otherwise applied. In a preferred embodiment, a second film 41 is supplied from a reel 43. The film 41 is guided to the top surfaces of the trays by a guide roll 45. Then the trays and the overlying films are transported past a heat sealing device 46 which is used to establish a film-to-film seal between the tray-lining film 28 and the second film 41 at the flanges of each tray.

The type of sealing device 46 which is employed may vary as a function of the film materials. Device 46 may be a conventional heating device or a dielectric or ultrasonic heating device capable of bonding the film materials through the application of high frequency energy.

Depending upon the nature of the films or coatings, one or both of the mating surfaces of the films may be coated with an adhesive to enhance the film-to-film seal.

For removal of excess film, a four-sided cutting attachment 47 is preferably located downstream of heating device 46. The four-sided cutting attachment 47 severs excess film from all sides of the tray simultaneously. Preferably, a scavenging mechanism is included for separating the excess film from the tray. The separated excess film may then be recycled. The trimming device and scavenger system are conventional in nature. The dimensions of the cutting frame may be intentionally made smaller than the peripheral dimensions of the tray to allow the cutting frame to remove excess tray flange material along with the excess film. While this location for cutting attachment 47 is preferred since both film layers 28 and 41 can be trimmed simultaneously, it will be understood that a separate trimming device might be used to trim film 28 before film 41 is even applied.

The separated and closed trays are then removed by conventional take-off conveyor 52.

FIG. 2 is a top view of a single tray 22 with an overlying transparent film 28 which has not yet been deformed into the interior of the receptacle. This condition exists on the conveyor 10 when heated plate 31 has sealed the film 28 to the tray flanges but before any vacuum deformation begins. Film 28 is somewhat wider than tray 22. The excess along the sides is gripped by conventional film tensioning mechanisms (not shown) prior to heating and edge sealing by heated plate 31.

FIG. 3 is a top view of one blank which might be used to form an erected, flanged tray which can be lined with film to provide a single or multiple compartment tray. The blank includes a bottom wall panel 72 and four side wall panels 74a, 74b, 74c, 74d connected to bottom wall panel 72 along fold lines 76. The opposed side wall panels 74a and 74c have end flaps 78 connected to the side wall panel along fold lines 79 which continue from the fold lines 76 at a slight angle. Flange panels 81 of generally rectangular shape are connected to opposed side wall panels 74b and 74d along scored or intermittently scored fold lines 83. Flange panels 80 are connected to the other two side wall panels 74a and 74c at scored or intermittently scored fold lines 82. The flange panels 80 are as wide as panels 81 but include corner-forming arcuate end portions 85 which extend beyond the fold lines 79.

To erect the tray from this blank, the side wall panels 74 are folded generally perpendicularly to the bottom wall 72. The flaps 78 are preferably secured to the exterior surfaces of the adjacent side wall panels 74b and 74d by conventional adhesives or other locking devices known to the artisan. The adhesives may be applied to the surfaces of the flaps 78 or main panels 74b and 74d beforehand. The flange panels 80 and 81 are bent outwardly. Due to their natural resilience, the bent flange panels 80 and 81 will remain somewhat upright relative to the horizontal plane of the bottom wall 72 until film 28 is applied. The film, when bonded, will tend to hold the flanges in a flat or horizontal plane.

To allow the liner of a paperboard tray to be formed with rounded corners when a vacuum deformation source is employed, only selected areas of the tray material must allow the passage of air being exhausted by the vacuum. A pattern of perforations or slits, including perforations 84 parallel to the fold lines 76 and diagonal perforations 85, may be formed in the tray bottom wall. The perforations do not have to meet or overlap at the corners but can be separated by small unperforated areas adjacent the corners formed by intersecting fold lines 76. These small areas facilitate drawing of the film into more rounded contour at the tray corners. Of course, if the tray material were typically air permeable, the same result could be achieved by applying a sealer to every area except the areas of strips 84.

Figure 4:
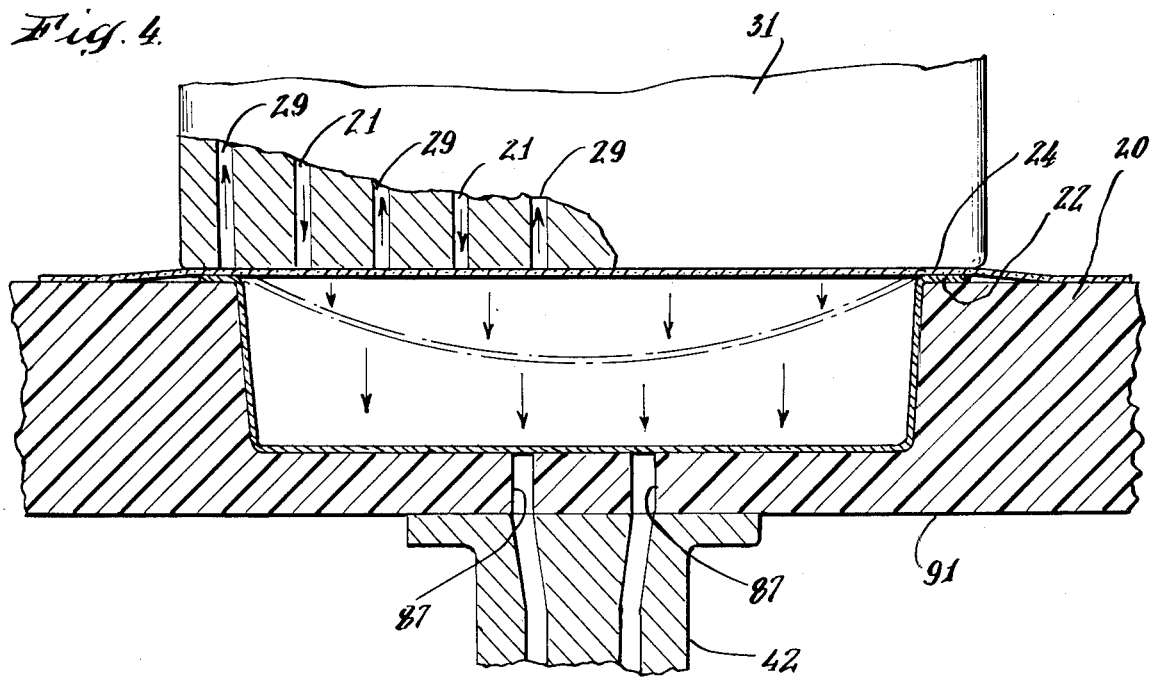
FIG. 4 is a cross-sectional side view showing an individual tray, an overlying film and the heated plate used to heat and edge seal the film.

FIG. 4 is an enlarged partial cross section of a tray 22 and film 28 at the station 25. To thoroughly heat the film 28 to a temperature just below its melting point, heated plate 31 contains a number of vacuum channels 29 within which a negative air pressure is established for a period on the order of 0.5 seconds to draw the film 28 tightly against the face of the plate. As the plate descends, it moves the heated film into a bonding contract with the flanges of the tray. Then, a vacuum is established by device 42 for a period of one to three seconds to draw air from predetermined areas of the tray cavity through at least one air channel 87 in support 84 forming a part of conveyor belt 10. The film deforms to a lesser extent in those areas of the tray, such as the corners, which are relatively air impermeable. The vacuum deformation step may be aided by jets of air applied to the top surface of film 28 through other air channels 21 in heated plate 31.

FIG. 5 shows film 28 following the heating/edge sealing/vacuum deforming steps at station 25 but before it is heat sealed to the bottom wall of the tray by reciprocating heated plug 36. As can be seen more clearly in this figure, plug 36 includes a heated contact plate 37 and a thermal insulating shell 39 which minimizes heating of any portion of film 28 except for the portion beneath the contact plate 37.

Figure 6:
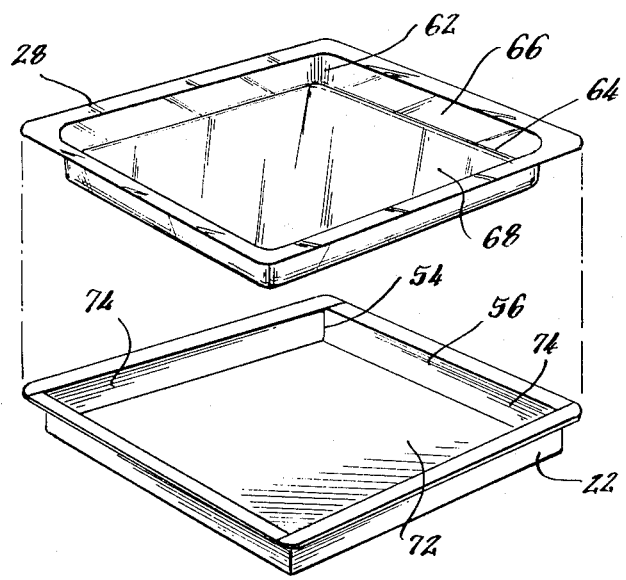
FIG. 6 is an exploded view of a tray and deformed liner produced in accordance with the present invention.

FIG. 6 is an exploded view of a tray 22 and film liner 28 as it would appear if separated from the tray at the end of the deformation process. The exploded view is for purposes of illustration only. In practice, the liner would be seated within the tray 22, being bonded thereto at the flanges and, optionally, at one or more selected areas within the tray.

While tray 22 has angular corners 54 and a sharp boundary 56 between its side walls 74 and its bottom wall 72, the deformed liner 28 has smoothly rounded corners, such as corner 62, and a rounded transition area 64 between its side walls 66 and its bottom wall 68. The rounded corners and the rounded transition area 64 permit a food product contained in the liner to be more evenly heated in a microwave oven than the same food product would be if placed directly in the tray 22 or in a liner which conforms to the tray 22. Moreover, the air trapped between the liner and the tray acts as thermal insulation which helps keep heated food warm and the exterior surface of the tray relatively cooler than the surface of a tray having a conforming liner. This thermal insulation also renders the tray more resistant to freeze/thaw cycles during storage or marketing.

Since the liner configuration does not have to match the tray configuration according to the present invention, it is possible to fabricate simple rectangular or multi-sided trays 22 with vertical or sloping side walls from low cost rigid materials while providing leakproof liners for the trays.

The corners of the flanges of tray 22 are generally rounded. To minimize the possibility of leakage after manufacture, the flanges abut at the tray corners but do not overlap.

Figure 7:
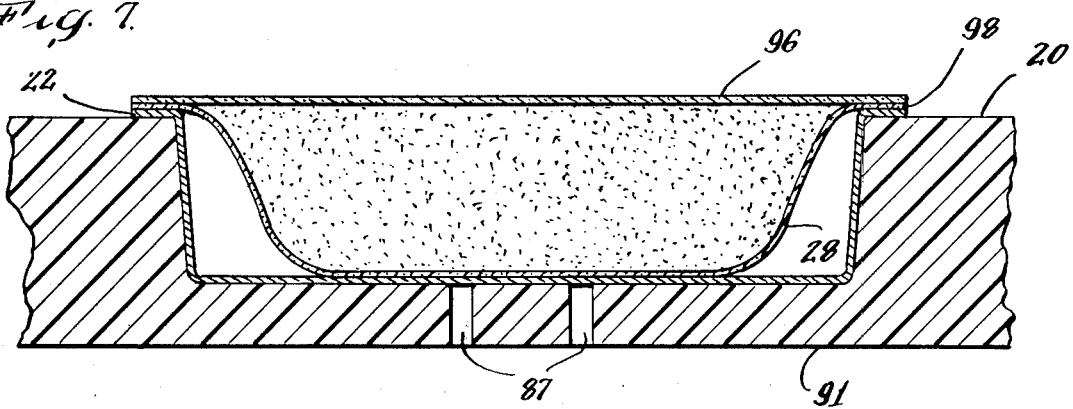
FIG. 7 is a cross-sectional side view of a closed tray made in accordance with the invention.

FIG. 7 is a cross-section of a single closed tray which would exist on conveyor belt 10 at the exit from sealing device 46. The lined tray 22 is closed by an overlying film 98 adhering thereto at the flanges of the tray. The tray would typically be filled with one or more food products. The film-to-film seal at the flanges of the tray is clearly shown. It is also possible to employ with equally good results a bead seal.

The flanges of a preferred embodiment of tray 22 serve several useful functions. Since the flanges are not in direct contact with a reheated food product, the flanges remain relatively cool after reheating in a microwave oven and can be more comfortably gripped by a consumer. The flanges also provide a contact area for the liner films, leaving the exterior surface of the tray free for decorative or informative graphic material. Finally, the flanges help rigidify the tray when secured in place by the tray liner and facilitate stacking of trays for shipping, packaging and display purposes.

Since the food product is effectively protected by the paperboard tray, the tray-lining film and the cover film, and since the exterior surfaces can be readily printed with graphic material and then coated, the tray can be marketed with a paperboard lid or sleeve, eliminating the normally used outer carton thereby further cutting packaging costs.

The preceding description indicates that the film lined tray is closed by a second film which is bonded to the first film at the tray flanges either by a heat seal or by adhesives. In accordance with an alternative embodiment of the invention, a paperboard lid with a compatible coating or film laminated to one side might be deposited directly on the first film at the tray flanges and be bonded to the tray with heat or adhesive.

While there has been described what is considered to be a preferred embodiment of the invention, variations and modifications therein may occur to those skilled in the art once they become acquainted with the basic concepts of the invention.

Therefore, it is intended that the appended claims shall be construed to include all variations and modifications, including but not limited to those discussed above, as fall within the true spirit and scope of the invention.

What is claimed is:

1. A lined carton comprising:
 (a) a tray of substantially non-air permeable material having a polygonal bottom wall and integral side walls substantially perpendicularly disposed from said bottom wall and having outwardly bent flanges substantially perpendicularly disposed from said side walls;

(b) means forming a centrally disposed preselected area defined by a predetermined pattern of air permeability for allowing the withdrawal of air therethrough during manufacture of said lined carton; and (c) a film liner having a polygonal bottom wall and outwardly extending side walls integrally connected to said bottom wall of said liner with the transition therebetween defined by rounded corners, the bottom wall of said liner being bonded to at least the preselected area of said bottom wall of said tray while being spaced from said tray at the sidewalls thereof and an area of the bottom wall of said tray adjacent each of its sidewalls, said liner having a peripheral flange outwardly extending from its sidewalls and bonded to the flanges of said tray, said corners being relatively more round than the transition corners formed between the bottom wall and side walls of said tray, the space between said tray and liner decreasing with an increase in height from the bottom wall of said tray.

2. A lined carton as recited in claim 1 further comprising a cover film, said cover film being sealed to said tray flanges.

* * * * *